No. 841,489. PATENTED JAN. 15, 1907.
F. N. DRANE.
POLE SPLICING DEVICE.
APPLICATION FILED MAY 26, 1906.
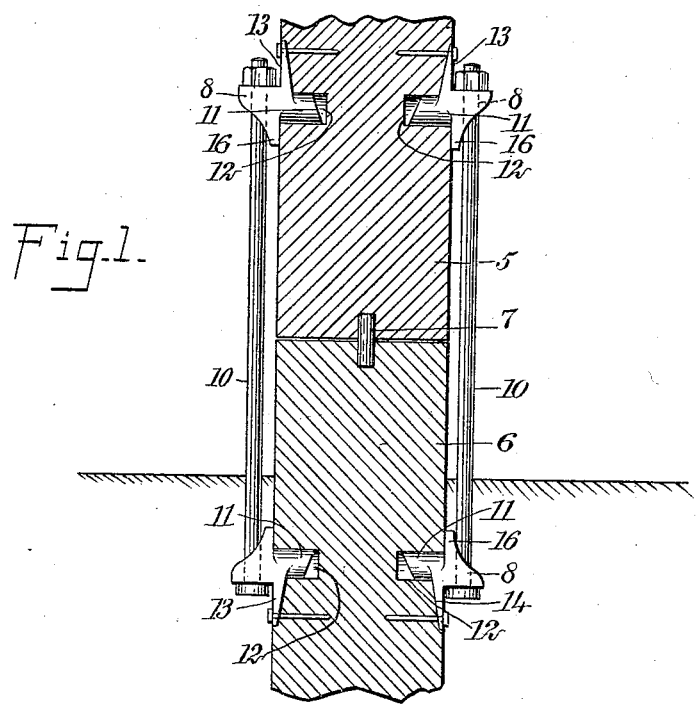
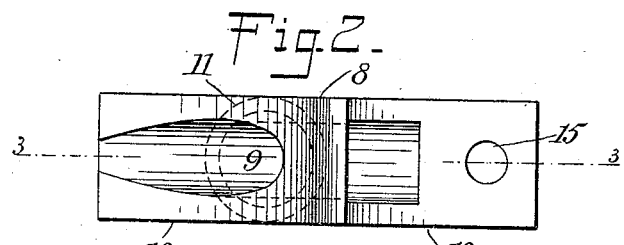
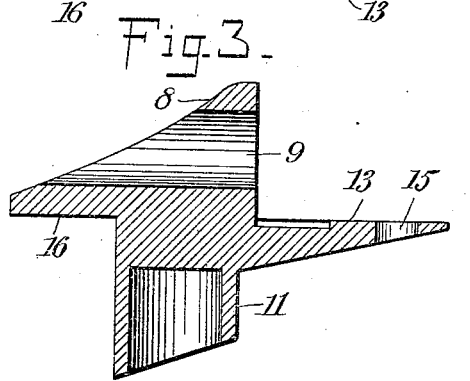
WITNESSES
INVENTOR
Frank N. Drane
BY
ATTORNEYS

UNITED STATES PATENT OFFICE.

FRANK NEAL DRANE, OF CORSICANA, TEXAS.

POLE-SPLICING DEVICE.

No. 841,489.   Specification of Letters Patent.   Patented Jan. 15, 1907.

Application filed May 26, 1906. Serial No. 318,837.

*To all whom it may concern:*

Be it known that I, FRANK NEAL DRANE, a citizen of the United States, and a resident of Corsicana, in the county of Navarro and State of Texas, have invented a new and Improved Pole-Splicing Device, of which the following is a full, clear, and exact description.

This invention relates to improvements in devices for splicing telegraph or other poles to timbers, concrete, or the like, an object being to provide a simple clamping means by which the main pole may be firmly secured to a new butt, replacing the original butt that may have become rotted in the ground, thus obviating the expense of a new complete pole; also, to provide a means by which new poles too short but otherwise good may be spliced to useful lengths.

Further, with my device a new wooden pole of cheap timber, such as pine, may be secured firmly to a butt of more durable wood, concrete, or the like.

I will describe a pole-splicing device embodying my invention and then point out the novel features in the appended claims.

Reference is to be had to the accompanying drawings, forming a part of this specification, in which similar characters of reference indicate corresponding parts in all the figures.

Figure 1 is a longitudinal section of a portion of a pole and butt, showing a splicing device embodying my invention. Fig. 2 is an outer face view of one of the clamping-blocks employed, and Fig. 3 is a section on the line 3 3 of Fig. 2.

Referring to the drawings, 5 indicates a portion of the main pole and 6 a portion of a butt, these parts being intended to engage one upon the other, as clearly indicated in Fig. 1, and to prevent possible lateral movement the parts are to be connected by a dowel 7.

The splicing means comprise a plurality of clamping devices consisting of blocks connecting with the pole and with the butt, the upper and lower blocks of a set being clamped by a bolt. Therefore a description of one clamping device will answer for all.

The clamping-block consists of a bracket-like member 8, having an opening 9, through which the bolt 10 passes, and on the bracket member is a lug 11 for engaging in a hole 12 formed in the butt and also in the main pole. Extended from the bracket is a plate 13, designed to engage in a recess 14 formed in the butt and pole and extending at an outward incline from the pole 12.

By seating the extension or plate 13 in the recess lateral movement of the bracket will be prevented, and as a further means for securing the bracket in place I provide it with a perforation 15, through which a bolt or screw may pass into the wood or other material. The bracket also has an extension 16, which rests upon the surface of the butt or pole.

The clamping-blocks will preferably be made of malleable iron, but they may be of cast-iron or any other metal without departing from the spirit of my invention.

The drawings clearly illustrate the operation of the splicing device—that is, the clamping-blocks are inserted in the holes of the main pole and also inserted in the holes of the butt, and the clamping rods or bolts 10 are passed through the same and tightened by the nuts thereon.

The plate 13 is made wedge shape to reduce the amount of metal and consequent cost, but giving sufficient strength at the base, where the greatest strain takes place, and by making the part 11 tubular and beveled at the end the weight is reduced where it is not needed, thus reducing the cost of manufacture.

Having thus described my invention, I claim as new and desire to secure by Letters Patent—

1. A pole-splicing device comprising clamping-blocks having bracket members provided with openings to receive bolts, lugs on said clamping-blocks for engaging in holes provided in the parts to be spliced, a bolt for passing through the upper and lower clamping-blocks, and plate-like extensions on the clamping-blocks for engaging with the members to be spliced.

2. A pole-splicing device comprising clamping-blocks having bracket members provided with openings, bolts for engaging in said openings; lugs on said blocks for engaging in holes formed in the members to be spliced, one of said members having a perforation through which a fastening-bolt or the like may pass.

3. The combination with a pole and butt, each having a hole formed in it, and a recess formed at an incline from the hole, of clamping-blocks having bracket members provided with openings, lugs for engaging in the holes in the parts to be spliced, the said lugs at the ends being inclined, plates extended from one side of the bracket portions, and inclined at the inner side to correspond to the incline of the recesses, plates extended from the opposite sides of the brackets, and bolts for passing through the openings in the brackets.

In testimony whereof I have signed my name to this specification in the presence of two subscribing witnesses.

FRANK NEAL DRANE.

Witnesses:
W. J. CHENEY,
R. N. ELLIOTT.